US011234116B2

(12) United States Patent
Nelson et al.

(10) Patent No.: US 11,234,116 B2
(45) Date of Patent: Jan. 25, 2022

(54) DISTRIBUTED LEDGER SYSTEM FOR MANAGEMENT AND IMPLEMENTATION OF EXCHANGES OF WIRELESS SERVICES BETWEEN WIRELESS SERVICE PROVIDERS

(71) Applicant: Geoverse, LLC, Sammamish, WA (US)

(72) Inventors: Roderick Nelson, Sammamish, WA (US); Carl Gunell, Sammamish, WA (US); Dan Westin, Sammamish, WA (US)

(73) Assignee: Geoverse, LLC, Bellevue, WA (US)

( * ) Notice: Subject to any disclaimer, the term of this patent is extended or adjusted under 35 U.S.C. 154(b) by 0 days.

(21) Appl. No.: 16/221,133

(22) Filed: Dec. 14, 2018

(65) Prior Publication Data

US 2019/0191293 A1    Jun. 20, 2019

Related U.S. Application Data

(60) Provisional application No. 62/598,601, filed on Dec. 14, 2017.

(51) Int. Cl.
*H04W 36/00* (2009.01)
*H04W 8/12* (2009.01)
(Continued)

(52) U.S. Cl.
CPC .......... *H04W 8/12* (2013.01); *G06F 16/1824* (2019.01); *H04L 12/14* (2013.01);
(Continued)

(58) Field of Classification Search
CPC ..... H04W 12/08; H04W 12/06; H04W 24/02; H04W 28/06; H04W 28/24; H04W 24/08;
(Continued)

(56) References Cited

U.S. PATENT DOCUMENTS 7,027,818 B2    4/2006 Bos et al.
7,133,670 B1    11/2006 Moll et al.
(Continued)

FOREIGN PATENT DOCUMENTS

EP    2 698 035    12/2015
EP    2 697 997    12/2019
(Continued)

OTHER PUBLICATIONS

Langberg, Ehud; "Blockchains In Mobile Networks", Wireless Software Competence Center, Huawei Technologies Co., Ltd. Mar. 14, 2017; [Retrieved from online on Jan. 17, 2019].
(Continued)

*Primary Examiner* — Phuc H Tran
(74) *Attorney, Agent, or Firm* — Polsinelli LLP

(57) ABSTRACT

The present disclosure is directed to using distributed ledger architectures. In one example, a distributed ledger system includes a first wireless provider and a second wireless provider configured to provide wireless services to one or more of end users of the first wireless provider to roam on; and a plurality of nodes associated with one or more of the wireless providers. Each of the plurality of nodes is configured to access a digital record of an exchange of wireless services between the first wireless provider and the second wireless provider; enable roaming of the one or more of the end users on the second wireless provider upon detecting a first triggering condition; monitor usage of the wireless services; verify the roaming based on the monitoring of the wireless services; and terminate the roaming of the one or more of the end users upon detecting a second triggering condition.

20 Claims, 10 Drawing Sheets

(51) Int. Cl.

| | |
|---|---|
| *H04M 15/00* | (2006.01) |
| *H04W 4/50* | (2018.01) |
| *G06F 16/182* | (2019.01) |
| *H04W 24/08* | (2009.01) |
| *H04W 60/04* | (2009.01) |
| *H04L 12/14* | (2006.01) |
| *H04W 4/24* | (2018.01) |
| *H04M 15/02* | (2006.01) |
| *H04W 48/18* | (2009.01) |

(52) U.S. Cl.
CPC ........ *H04L 12/1407* (2013.01); *H04M 15/50* (2013.01); *H04M 15/51* (2013.01); *H04M 15/62* (2013.01); *H04M 15/66* (2013.01); *H04M 15/8038* (2013.01); *H04M 15/85* (2013.01); *H04M 15/852* (2013.01); *H04M 15/854* (2013.01); *H04M 15/88* (2013.01); *H04M 15/888* (2013.01); *H04W 4/24* (2013.01); *H04W 4/50* (2018.02); *H04W 24/08* (2013.01); *H04W 36/00837* (2018.08); *H04W 48/18* (2013.01); *H04W 60/04* (2013.01)

(58) Field of Classification Search
CPC . H04W 36/00837; H04W 48/18; H04W 4/24; H04W 12/00; H04L 2209/80; H04L 63/123; H04L 9/3239
See application file for complete search history.

(56) References Cited

U.S. PATENT DOCUMENTS

| | | | | |
|---|---|---|---|---|
| 8,620,308 B2* | 12/2013 | Maria | ...................... | H04L 12/66 370/328 |
| 8,687,557 B2* | 4/2014 | Perkuhn | .................. | H04W 8/06 370/328 |
| 9,231,835 B2* | 1/2016 | Zisimopoulos | ....... | H04W 28/24 |
| 9,253,663 B2* | 2/2016 | Raleigh | .................. | H04W 24/02 |
| 9,300,562 B2* | 3/2016 | Dufour | .................... | H04L 43/10 |
| 9,338,654 B2* | 5/2016 | Moore | .................. | H04W 12/08 |
| 9,565,025 B2* | 2/2017 | Van Veen | .............. | H04M 15/53 |
| 9,763,182 B1* | 9/2017 | Krishnamurthy | ..... | H04W 48/18 |
| 10,063,529 B2* | 8/2018 | Milazzo | .................. | H04L 63/06 |
| 10,771,634 B2 | 9/2020 | Nelson | | |
| 2003/0051041 A1 | 3/2003 | Kalavade et al. | | |
| 2007/0199049 A1 | 8/2007 | Ziebell | | |
| 2010/0311418 A1 | 12/2010 | Shi et al. | | |
| 2010/0316029 A1* | 12/2010 | Kappler | .............. | H04L 41/0813 370/338 |
| 2011/0039518 A1* | 2/2011 | Maria | ...................... | H04L 12/66 455/406 |
| 2012/0115466 A1* | 5/2012 | Moore | .................. | H04L 63/102 455/432.1 |
| 2012/0134323 A1* | 5/2012 | Perkuhn | .............. | H04L 65/1016 370/328 |
| 2012/0185578 A1 | 7/2012 | Perkuhn et al. | | |
| 2012/0196644 A1 | 8/2012 | Sherzer et al. | | |
| 2014/0052852 A1* | 2/2014 | Dufour | .................... | H04L 43/10 709/224 |
| 2014/0094159 A1* | 4/2014 | Raleigh | ................. | H04W 24/02 455/418 |
| 2014/0115159 A1* | 4/2014 | Zisimopoulos | ....... | H04W 28/24 709/225 |
| 2014/0274036 A1 | 9/2014 | Fan et al. | | |
| 2015/0215832 A1 | 7/2015 | Fitzpatrick | | |
| 2017/0076306 A1 | 3/2017 | Snider et al. | | |
| 2017/0279783 A1* | 9/2017 | Milazzo | ................ | H04L 63/061 |
| 2017/0287090 A1* | 10/2017 | Hunn | ..................... | G06Q 50/18 |
| 2018/0077564 A1* | 3/2018 | Xu | .......................... | H04W 24/08 |
| 2019/0080392 A1* | 3/2019 | Youb | ..................... | H04L 9/0643 |
| 2019/0139047 A1 | 5/2019 | Ronnow et al. | | |
| 2019/0150036 A1 | 5/2019 | Nelson | | |
| 2019/0158674 A1 | 5/2019 | Nelson | | |
| 2021/0075914 A1 | 3/2021 | Nelson | | |

FOREIGN PATENT DOCUMENTS

| | | |
|---|---|---|
| EP | 3 714 416 | 9/2020 |
| EP | 3 725 066 | 10/2020 |
| WO | WO 2009/006071 | 1/2009 |
| WO | WO 2017/136643 | 8/2017 |
| WO | WO 2017/186297 | 11/2017 |
| WO | WO 2019/099729 | 5/2019 |
| WO | WO 2019/104159 | 5/2019 |
| WO | WO 2019/118903 | 6/2019 |

OTHER PUBLICATIONS

PCT Application No. PCT/US2018/061368 International Search Report and Written Opinion dated Feb. 8, 2019.
PCT Application No. PCT/US2018/062235 International Search Report and Written Opinion dated Feb. 6, 2019.
PCT Application No. PCT/US2018/065804 International Search Report and Written Opinion dated Feb. 14, 2019.
PCT/US18/65804, Distributed Ledger System for Management and Implementation of Exchanges of Wireless Services Between Wireless Service Providers, filed Dec. 14, 2018.
U.S. Appl. No. 16/192,629, Roderick Nelson, Distributed Ledger System for Management of Exchanges of Wireless Services Between Wireless Service Providers, filed Nov. 15, 2018.
PCT/US18/61368, PCT Distributed Ledger System for Management of Exchanges of Wireless Services Between Wireless Service Providers, filed Nov. 15, 2018.
U.S. Appl. No. 16/197,900, Roderick Nelson, Distributed Ledger System for Management and Tracking of Exchanges of Wireless Service Providers, filed Nov. 21, 2018.
PCT/US18/62235, Distributed Ledger System for Management and Tracking of Exchanges of Wireless Service Providers, filed Nov. 21, 2018.
U.S. Appl. No. 16/192,629 Office Action dated Nov. 29, 2019.
U.S. Appl. No. 16/192,900 Office Action dated Jan. 2, 2020.
U.S. Appl. No. 17/009,198, Roderick Nelson, Distributed Ledger System for Management and Tracking of Exchanges of Wireless Services Between Wireless, filed Sep. 1, 2020.
PCT Application No. PCT/US2018/061368 International Preliminary Report on Patentability dated May 19, 2020.
PCT Application No. PCT/US2018/062235 International Preliminary Report on Patentability dated May 26, 2020.
PCT Application No. PCT/US2018/065804 International Preliminary Report on Patentability dated Jun. 16, 2020.
Deloitte, Blockchain @ Telco How blockchain can impact the telecommunications industry and its relevance to the C-Suite Introduction to blockchain, Nov. 28, 2016, XP055394340, Retrieved from the Internert: URL: https://www2.deloitte.com/content/dam/Deloitte/za/Documents/technology-media-telecommunications/za_TMT_Blockchain_TelCo.pdf, 14 pages.
Saravanan, M et al.: "Smart Contracts in Mobile Telecom Networks", 2017 23rd Annual International Conference In Advanced Computing and Communications (ADCOM), IEEE, Sep. 8, 2017, pp. 27-33.
European Application No. 18889051.1, Extended European Search Report dated Jul. 27, 2021.
European Application No. 18882223.3, Extended European Search Report dated Jul. 19, 2021.

* cited by examiner

DISTRIBUTED LEDGER SYSTEM FOR MANAGEMENT AND IMPLEMENTATION OF EXCHANGES OF WIRELESS SERVICES BETWEEN WIRELESS SERVICE PROVIDERS

CROSS-REFERENCE TO RELATED APPLICATIONS

This application claims priority to U.S. Provisional Patent Application No. 62/598,601 filed on Dec. 14, 2017, the entire content of each of which is incorporated herein by reference.

BACKGROUND

Field of the Disclosure

The present disclosure relates to using distributed ledger architectures and cryptocurrencies to enable execution, monitoring and validation of service agreements between wireless service providers for provisioning of wireless communication resources.

Description of the Related Art

Various generations of wireless technologies and supporting networks have been designed, standardized, implemented and used globally to service millions/billions of end users. These wireless networks have evolved from analog to digital radio access systems, from circuit switching to packet core, from proprietary mobility and administrative protocols to standardized protocols, and from single provider to multi provider networks.

The continuous evolution of these networks to cover as large of a geographical area as possible and serve as many users as possible, as well as the continuous evolution of collaboration and interaction between diverse access methods, have added complexities to administration of end users' mobility across different wireless networks. In other words, administration of roaming of end users from one wireless network to another has created complex technical and business administration problems.

Typically, these administration challenges are handled by various types of back office administrative functions for collecting information from their network and information received from each partner network on which a user device has roamed. With each network implementing such administrative functions, not only wireless network providers costs and overhead are increased, the management also requires use of network resources that can otherwise be dedicated to improve services provided to end users.

One can readily understand that this problem can only be exacerbated as more and more networks come online and provide services to end users. Manual administration and management of roaming services across hundreds or thousands (and possibly millions) of wireless networks would be time consuming and cost prohibitive.

Furthermore, agreed upon pricing of roaming services between providers of wireless networks can vary slowly between any two groups of wireless network providers and do not dynamically take into account that a cellular network is not homogenous in its value across location and time. The result of this slow-moving process is lost value opportunity for both the provider and consumer of roaming services across wireless networks. In other words, sellers are not rewarded for the unique value they may have in portions of their network and buyers may be overpaying in some cases.

Therefore, a platform that provides for an efficient, automatic and transparent creation and settlement of services between wireless service providers is needed.

SUMMARY

One or more example embodiments of inventive concepts are directed to using distributed ledger architectures and cryptocurrencies to enable creation and execution of service agreements between wireless service providers for provisioning of wireless communication resources.

One aspect of the present disclosure is a distributed ledger system for facilitating an exchange among wireless service providers. The distributed ledger system includes a plurality of wireless service providers including a first wireless service provider having a corresponding number of end users or a second wireless service provider configured to provide wireless services to one or more of the end users to roam on; and a plurality of nodes, each of which is associated with one or more of the plurality of wireless service providers. Each of the plurality of nodes being configured to access a digital record of an exchange of wireless services between the first wireless service provider and the second wireless service provider, the digital record including agreed upon terms and conditions of the exchange; enable roaming of the one or more of the end users on the second wireless service provider upon detecting a first triggering condition; monitor usage of the wireless services of the second wireless service provider by the one or more end users; verify the roaming based on the monitoring of the wireless services; and terminate the roaming of the one or more of the end users upon detecting a second triggering condition.

One aspect of the present disclosure is a method that includes accessing, by a network node, a digital record of an exchange of wireless services between a first wireless service provider and a second wireless service provider for one or more end users of the first wireless service provider to roam on the second wireless service provider, the digital record including agreed upon terms and conditions of the exchange; enabling, by the network node, roaming of the one or more of the end users on the second wireless service provider upon detecting a first triggering condition; monitoring, by the network node, usage of wireless services of the second wireless service provider by the one or more end users; verifying, by the network node, the roaming based on the monitoring of the wireless services; and terminating, by the network node, the roaming of the one or more of the end users upon detecting a second triggering condition.

One aspect of the present disclosure is a distributed ledger system that includes a plurality of wireless service providers including a first wireless service provider having a corresponding number of end users or a second wireless service provider configured to provide wireless services to one or more of the end users to roam on; and a plurality of nodes, each of which is associated with one or more of the plurality of wireless service providers. Each of the plurality of nodes is configured to facilitate an exchange of wireless services between the first wireless service provider and the second wireless service provider; validate the wireless services of the second wireless service provider; and manage the exchange based on results of validating the wireless services.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
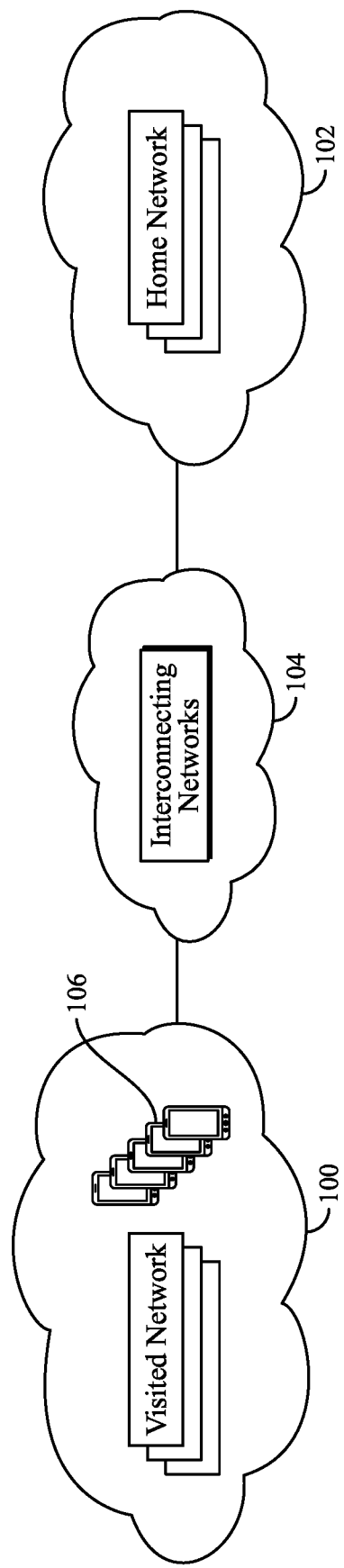
FIG. 1 illustrates an example ecosystem of home networks, visited networks and end users.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring embodiments.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Example embodiments of the present disclosure will be described more fully hereinafter with reference to the accompanying drawings in which like numerals represent like elements throughout the several figures, and in which example embodiments are shown. Example embodiments of the claims may, however, be embodied in many different forms and should not be construed as limited to the example embodiments set forth herein. The examples set forth herein are non-limiting examples and are merely examples among other possible examples.

Wireless network service providers (may also be referred to as wireless service providers or simply wireless providers) participate in a wholesale marketplace, or ecosystem, for the purchase or sale (exchange) of wireless network capacity between them such that end users of one provider can roam, according to the agreed upon terms of such exchange. This process is sometimes referred to as roaming between networks where end users of a "home" network use the "visited" network's capacity and resources while traveling. The home network purchases this capacity at wholesale from the visited network. The home network then retails the service to their end users. Buyers may be sellers at the same time in different locations or for different uses. Sellers must operate, or be the managing entity, of wireless networks but buyers can have end users without necessarily having their own networks.

Administration and management of such agreements (wholesale agreements) between any two wireless network providers become more difficult as the number of available wireless service providers increase. Furthermore, each network provider may need to allocate more network resources to such administration and management, which may come at the expense of having less network resources available for servicing end users. Hereinafter, example embodiments will be described according to which a distributed ledger system will be utilized to manage, monitor and validate execution of smart contracts that memorialize terms and conditions of an agreement or exchange between two service providers for roaming services as well as validation of wireless services to be provided according to the exchange.

Furthermore, as noted above, currently third party clearing houses handle, partially or entirely, management of exchanges of wireless services between wireless service providers. This management and communication with various parties to such exchanges require significant network infrastructure, servers, databases, etc. on behalf of the wireless service providers and the clearing houses. The concepts described in this application provide means and techniques to do away with such clearing houses and thus reduce network resource usage in managing exchanges by providing less centralized and more peer to peer schemes for exchange management.

FIG. 1 illustrates a diagram depicting multiple wireless networks where the users of one network may use the services of another network. As shown in FIG. 1, wireless networks and corresponding providers may be split into two groups, one of which may form a visited networks group 100 and another one of which may be a home networks group 102. Visited networks group 100 and home networks group 102 may communicate via any known or to be developed interconnecting networks 104 for exchange of user traffic. Each member of visited network group 100 can be a wireless network provider that provides wireless network capacity to end users (subscribers) of one or more wireless network providers of home networks group 102 and hence may be referred to as a visited network. Each member of home networks group 102 can be a wireless network provider that has one or more subscribers (e.g., end users 106) and hence may be referred to as a home network. End users 106 of a given home network can utilize services provided by one or more visited network and thus are shown in association with visited networks group 100 in FIG. 1 indicating that end users 106 are roaming (using wireless network capacities) on one or more visited networks of visited networks group 100.

In one example embodiment, coverage area of a visited network and a home network may overlap. Therefore, it may be desirable for the home network to enter into an exchange with the visited network to offload some of its traffic to visited network to both decrease its own network resource utilization and increase under-utilized resources of the visited network. In another example, a home network may not provide services in a geographical region in which the visited network provides coverage. Therefore, it may be desirable for the home network to enter into an exchange with the visited network to have end users of home network roam on the visited network.

Each one of end users 106 may be an electronic device or component capable of establishing and utilizing wireless network services of a provider. Examples of end users 106 include, but are not limited to, mobile phones, smartphones, tablets, laptops, cameras, any type of known or to be developed Internet of Things (IoT) devices, that utilize the capacity of a seller network provider.

Figure 2A:
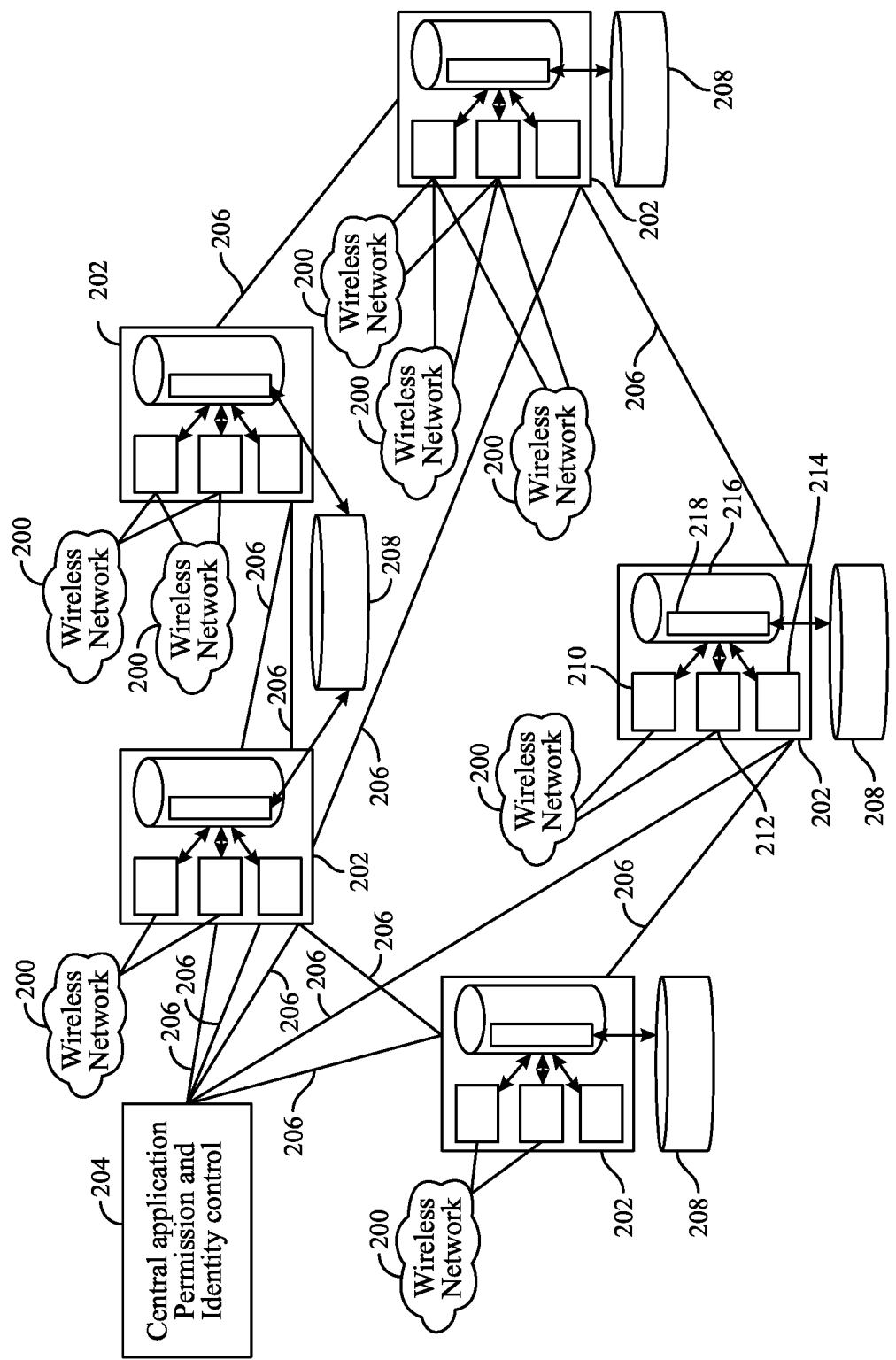
FIG. 2A is an illustrative block diagram of interconnection of components of ecosystem of FIG. 1 for exchange of services.

FIG. 2A is an illustrative block diagram of interconnection of components of ecosystem of FIG. 1 for exchange of services.

FIG. 2A illustrates a series of wireless networks 200, each of which may be one of a visited network or a home network described above with reference to FIG. 1. Each of wireless networks 200 may be a wireless service provider configured to provide wireless services to one or more user devices within a confined premise such as a building, a group of buildings in close proximity to each other, a group of buildings commonly owned but dispersed across multiple geographical locations, etc.

Figure 2B:
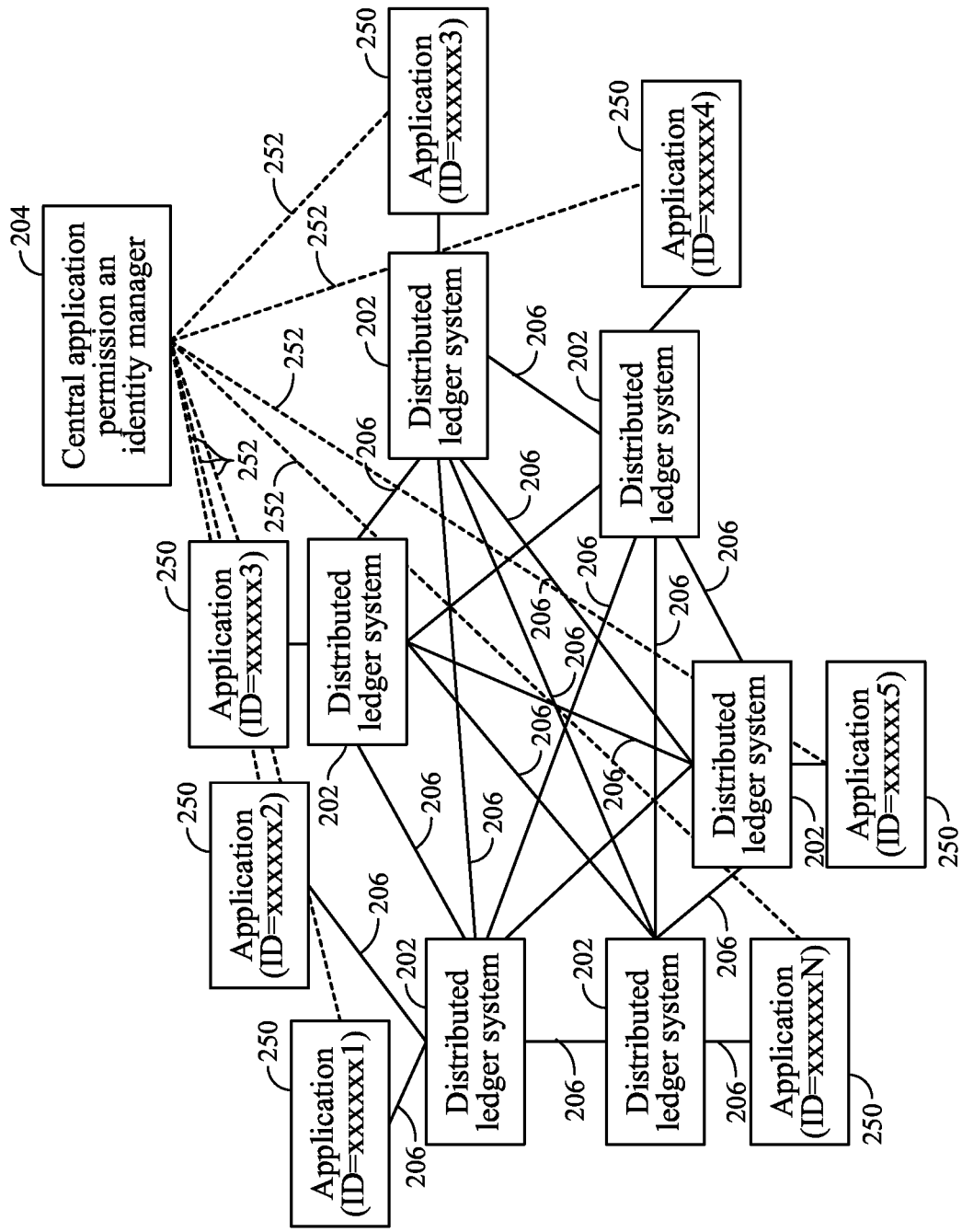
FIG. 2B is an illustrative block diagram of interconnection of components of ecosystem of FIG. 1 for exchange of services.

Each of wireless networks 200 of FIG. 2B may be associated with a node 202 on a permissioned blockchain (distributed ledger) system for automated management of exchange of services between wireless networks 200. Nodes 202 are connected to each other via one of links 206 which may be wireless links. Connected nodes 202 form the distributed ledger system and can be collectively referred to as the distributed ledger system 202.

Each node 202 may be a standalone server running computer-readable instructions to perform functionalities as will be described below with reference to FIG. 3. In another example, infrastructure on which a given node 202 is implemented may be provided by a private, public and/or a hybrid cloud service provider.

As shown in FIG. 2A, there may be more than one wireless network 200 associated with a given node 202.

FIG. 2A further illustrates a central application permission and identity control component 204, which may hereinafter be referred to as controller 204. Controller 204 may also be considered a component of the distributed ledger system. In one example, controller 204 may manage participation of wireless service providers within distributed ledger system, validate their identities, provide them with encryption keys for storing information on one or more nodes of distributed ledger system, manage visibility of each wireless provider 200's information to other wireless service providers 200, etc.

Each node 202 of distributed ledger system may implement computer-readable instructions to enable an exchange of wireless services or network resources between at least two wireless service providers 200 (e.g., one home wireless network and one visited wireless network) according to the process of FIG. 3, which will be described below.

Links 206, which may be any known or to be developed wired and/or wireless communication means for communicatively coupling any one of components of FIG. 2A to any other component of FIG. 2A.

Each node 202 of FIG. 2A may have a distributed storage node 208 associated therewith, which together form a database for storing various information regarding exchanges between wireless networks. By utilizing a network of distributed storage nodes 208, each node 202 does not need to keep record of exchanges and may simply store a pointer to a location in distributed storage nodes 208 at which corresponding data is stored.

As shown in FIG. 2A, there may be more than one node 202 associated with a given distributed storage node 208.

FIG. 2B is an illustrative block diagram of interconnection of components of ecosystem of FIG. 1 for exchange of services.

Similar to FIG. 2A, example ecosystem of FIG. 2B includes nodes 202, controller 204 and links 206. FIG. 2B illustrates a number of application nodes 250, where each node 202 may have more than one application node 250 associated therewith. In other words, applications nodes 250 are decoupled from nodes 202 in FIG. 2B, which allows for scalability of distributed ledger system formed of nodes 202 due to allowing for multiple wireless service providers such as wireless service providers 200 being able to utilize any one of application nodes 250 to form, execute and settle an exchange for wireless network services with any other wireless service provider 200 within the ecosystem shown in FIG. 2B. As shown in FIG. 2B, each application node 250 may have a corresponding identification (ID) (e.g., in the format of xxxxxx1 to xxxxxxN as shown in FIG. 2B, where N is a positive integer greater than 1).

Each application node 250 may be executed on a standalone server associated with a corresponding wireless service provider 200 or may be executed on a cloud based infrastructure accessible to wireless service providers 200. Components of each application node 250 will be further described below with reference to FIG. 3.

FIG. 2B further illustrates links 252 between controller 204 and each of application nodes 250, which, as will be described below, enables management of participants (wireless service providers 200) within the ecosystem, providing them with encryption keys for registering and recording content on the distributed ledger system, etc., as will be described below.

Figure 3A:
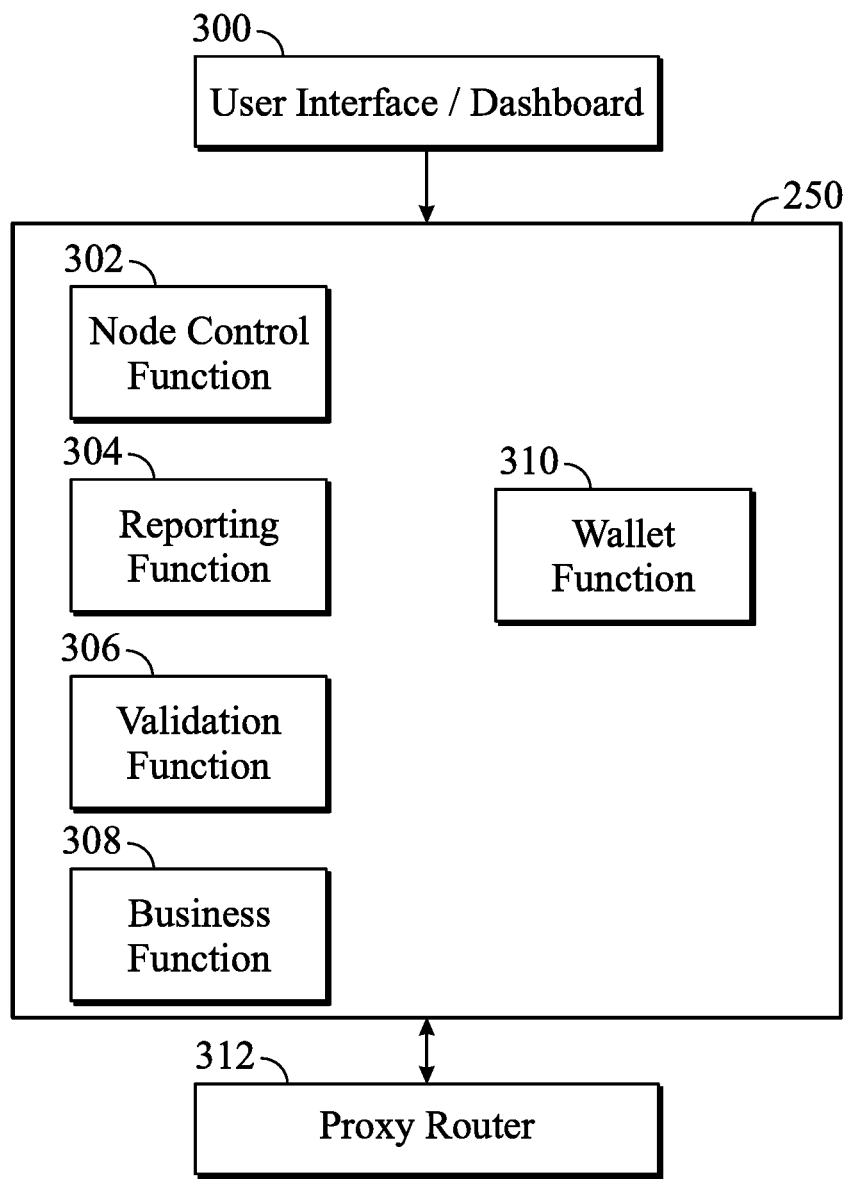
FIG. 3A is an example block diagram of components of an application of FIG. 2B.

FIG. 3A is an example block diagram of components of an application of FIG. 2B. While several components of each application node 250 will be described below with reference to FIG. 3A, it will be understood that these components may be in the form of computer-readable instructions stored on a memory and executed by one or more processors at application node 250 for implementing functionalities thereof.

Application node 250 may be accessible to a corresponding wireless network (e.g., a home network or a visited network) via user interface/dashboard 300. Application node 250 may have components including, but not limited to, a node control function 302, a reporting function 304, a validation function 306, a business function 308 and a wallet function 310.

Node control function 302 may be implemented to provision usage of wireless services of a visited network for end users of a home network. For example, when application node 250 is associated with a visited network, the node control function 302 thereof may operate to on board visiting end users, steer traffic destined to or originating from the visiting end users to other network components or to a gateway for transmission to external destinations, manage roaming of visiting end users on the visited network, perform known or to be developed radio network management functions, etc. In another example, when application node 250 is associated with a home network the end users of which are roaming on a visited network, the corresponding node control function 302 may implement functionalities including, but not limited to, steering network traffic received at the home network and destined for the end users roaming on a visited network, to the visited network, perform radio network management functionalities, update and monitor records of the end users roaming on a visited network and amount of roaming services used by each such end user, etc.

Reporting function 304 may be implemented to report various types of information regarding exchanges to corresponding wireless network(s) 200. Such information includes various measurements of wireless services used by visiting end users using any known or to be developed monitoring methods and components implemented within the network architecture of a visited network.

Validation function 306 may be implemented to validate resource usages under terms and conditions of an exchange, validate an exchange, etc., as will be described below with reference to FIGS. 4-6.

Business function 308 may be implemented to access records of smart contracts on distributed ledger system 202 for execution of terms and conditions thereof, as will be described below.

Wallet function 310 may be implemented to process any type of known or to be developed payment method (e.g., conventional payment methods, cryptocurrencies, etc.) to partially or completely settle (pay for) an exchange between a visited network and a home network for a particular exchange.

In one example, each node application 250 may be associated with a proxy router 312 for enabling the implementation of functionalities of each of the above described functions within the ecosystem of FIGS. 2A and 2B. Such proxy router 312 may be any type of known or to be developed router that can interface with node application 250 and other components of visited or home network, as will be described below with reference to FIG. 3B.

Figure 3B:
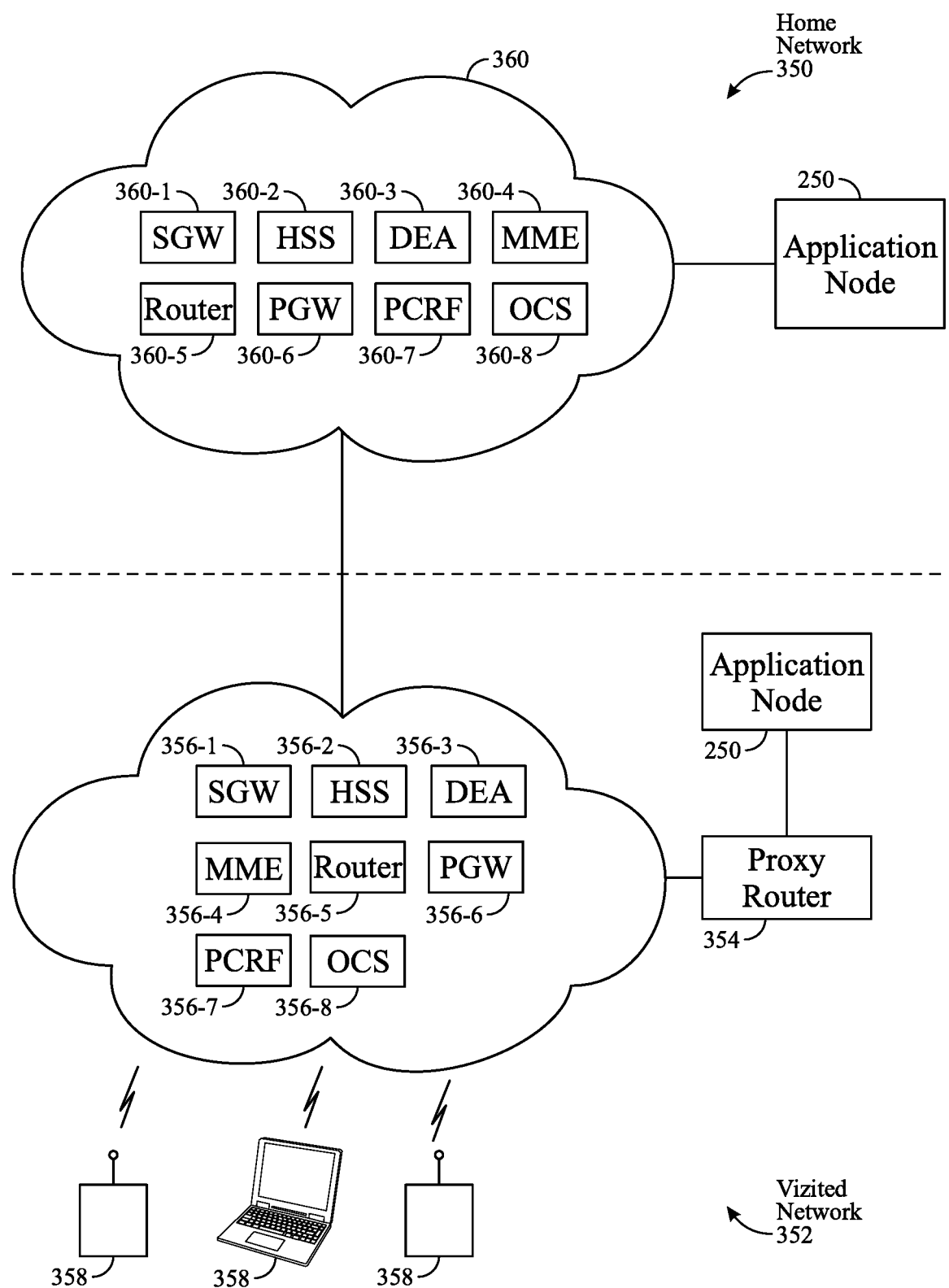
FIG. 3B illustrates an example network architecture of a home network and a visited network.

FIG. 3B illustrates an example network architecture of a home network and a visited network.

As shown in FIG. 3B, home network 350 and visited network 352, can be any one of networks 200 described above, which can interface with distributed ledger system described above via corresponding application node 250.

With respect to visited network 352, FIG. 3B illustrates that in one example, corresponding application node 250 can communicate with core network components (core 356) of visited network 352 via proxy router 354. However, use of proxy router 354 is optional and instead, application node 250 can directly interface with core 356. This direct interfacing is illustrated in FIG. 3B with reference to home network 350, where corresponding node application 250 is directly interfaced with core 360 of home network 350.

FIG. 3B further illustrates several examples of end users 358, which are subscribers of home network 350 that are roaming on visited network 352 based on an agreed upon exchange between home network 350 and visited network 352.

Core 356 includes any number of known or to be developed components for operation of visited network 352 including but not limited to Serving Gateway (SGW) 356-1, Home Subscriber Server (HSS) 356-2, Diameter Edge Agent (DEA) 356-3, Mobility Management Entity (MME) 356-4, one or more routers 356-5, Packet Gateway (PGW) 356-6, Policy and Charging Rules Function (PCRF) 356-7, Online Charging System (OCS) 356-8, etc.

In one example, PCRF 356-7 and OCS 356-8 may be utilized by each network for charging its corresponding subscribers for roaming services used by the subscribers (end users) according to the terms and conditions of their corresponding wireless service agreements.

Remaining example components of core 356 may operate according known or conventional functionalities thereof to enable operation and providing of wireless services by visited network 352. Therefore, further detailed discussions of their operations will not be provided for sake of brevity.

FIG. 3B also illustrates several components 360-1 to 360-8 of core 360 of home network 350, which may operate in the same manner as their corresponding counterpart described here with reference to core 356. Hence, further detailed discussion of components 360-1 to 360-8 of core 360 will not be provided for sake of brevity.

In one example, exchange of information between home network 350 and visited network 352 (e.g., information about an exchange, steering of traffic between the two networks such as traffic destined for end users 358, etc.) may be made possible via interfacing of DEA 356-3 and 360-3 of cores 356 and 360, respectively. In another example, such exchange of information may also be made possible via proxy router 354.

Having described various architectures, components and configurations of a distributed ledger system and wireless networks associated therewith, hereinafter examples will be provided that enable monitoring, management and validation of an agreed upon exchange between two wireless network providers such as home network 350 and visited network 352 for end users 358 of home network 352 to roam on (use wireless services) of visited network 352.

Figure 4:
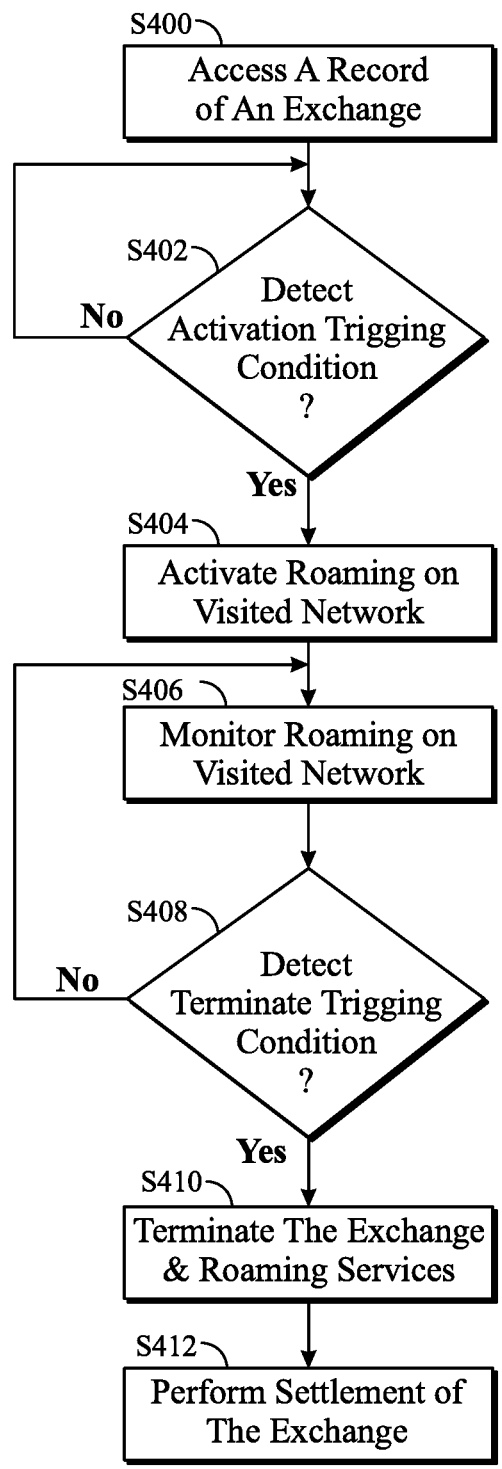
FIG. 4 is an example method of monitoring and managing an exchange of wireless services between two or more wireless network providers.

FIG. 4 is an example method of monitoring and managing an exchange of wireless services between two or more wireless network providers. FIG. 4 will be described from perspective of any one of application nodes 250 of FIG. 2B. However, it will be understood that each application node 250 may have one or more processors having computer-readable instructions stored thereon, which when executed by one or more processors, allow application node 250 to perform steps of FIG. 4 as will be described below (by implementing various functional components described above with reference to FIG. 3A). Furthermore, FIG. 4 will be described with reference to FIGS. 1, 2A, 2B, 3A and 3B. Within example structure of FIG. 2A, steps of FIG. 4 may be performed by each node 202 which may have one or more processors having computer-readable instructions stored thereon, which when executed by one or more processors, allow each node 202 to perform steps of FIG. 4 as will be described below. Furthermore, steps of FIG. 4 may be performed by proxy router 312 and/or 354 instead of or in concert with (in combination with) application node 250.

At S400, application node 250 (which can be any one of application nodes 250 of FIG. 2B) may access a record (a digital record) of an exchange codified in the form of a smart contract on the distributed ledger system of FIGS. 2A and 2B. Application node 250 may access the smart contract by making an inquiry to retrieve the smart contract (e.g., from distributed storage node 208). Such smart contract, as mentioned above, may provide a verifiable record of terms and conditions of an exchange between two wireless service providers such as home network 350 and visited network 352.

Such terms and conditions may specify information including, but not limited to, an activation triggering condition for activating the exchange and roaming of end users 358 on visited network 352. Such activation triggering conditions may include an agreed upon activation date and time, detection of a single or multiple end users 358 in coverage area of visited network 352, etc. The terms and conditions can also specify types of wireless services to be provided by visited network 352 to end users 358, duration of time during which the exchange is active and valid, a termination triggering condition (which can be an agreed upon date and time, absence of any of end users 358 in coverage area of visited network 352 for longer than a threshold period of time (e.g. a few hours, a day, a week, etc.), maximum amount of data usage by end users 358, etc.).

At S402, application node 250 may determine if an activation triggering condition is detected, where such activation triggering condition, as described above, may be specified by terms and conditions of the exchange.

If no activation triggering condition is detected, then S402 is repeated until an activation triggering condition is detected. Once detected, at S404, application node 250 may activate the exchange, which allows (permits) end users 358 of home network 350 to roam on visited network 352 and use wireless services provided thereby according to terms and conditions of the smart contract. S404 may be implemented by execution computer-readable instructions corresponding to node control function 302 described with reference to FIG. 3A.

At S406, application 250 may monitor the exchange (monitor roaming of end users 358 on visited network 352). Such monitoring may include verifying usage reports of the wireless services of visited network 350, independently generated by home network 350 and visited network 352, which will be further described below with reference to FIG. 5.

In one example, monitoring at S406 may be performed periodically, at agreed upon times and dates or continuously.

At S408, application node 250 may determine if a termination triggering condition is detected for terminating the exchange. If a termination triggering condition is not detected, the process reverts back to S306 and application node 250 may periodically perform the validation.

At S410 and upon detecting a termination triggering condition, application node 250 may terminate the roaming of end users 358 on visited network 352.

At S412, application node 250 may perform settlement of the exchange, which includes payment by home network 350 to visited network 352 for roaming services rendered by visited network 350 to end users 358, according to terms and conditions of the exchange. Such payment may be in any type of agreed upon form of payment including, but not limited to, cryptocurrencies, conventional payment methods, etc.

In one example, terms and conditions of the exchange may provide for partial settlement of the exchange upon reaching agreed upon milestone(s). For example, home network 350 and visited network 352 may agree that once the exchange is activated, a partial settlement may be performed on a daily, weekly, monthly, annual, etc. basis. In another example, a partial settlement may be performed once a limit of data usage is reached by end users 358 on visited network 352. For example, a partial settlement may be performed once 10 GB of data is used by end users 358. In such case, settlement at S412 may be performed periodically before detection of the termination triggering condition and any remaining settlement may be processed at S312.

Figure 5:
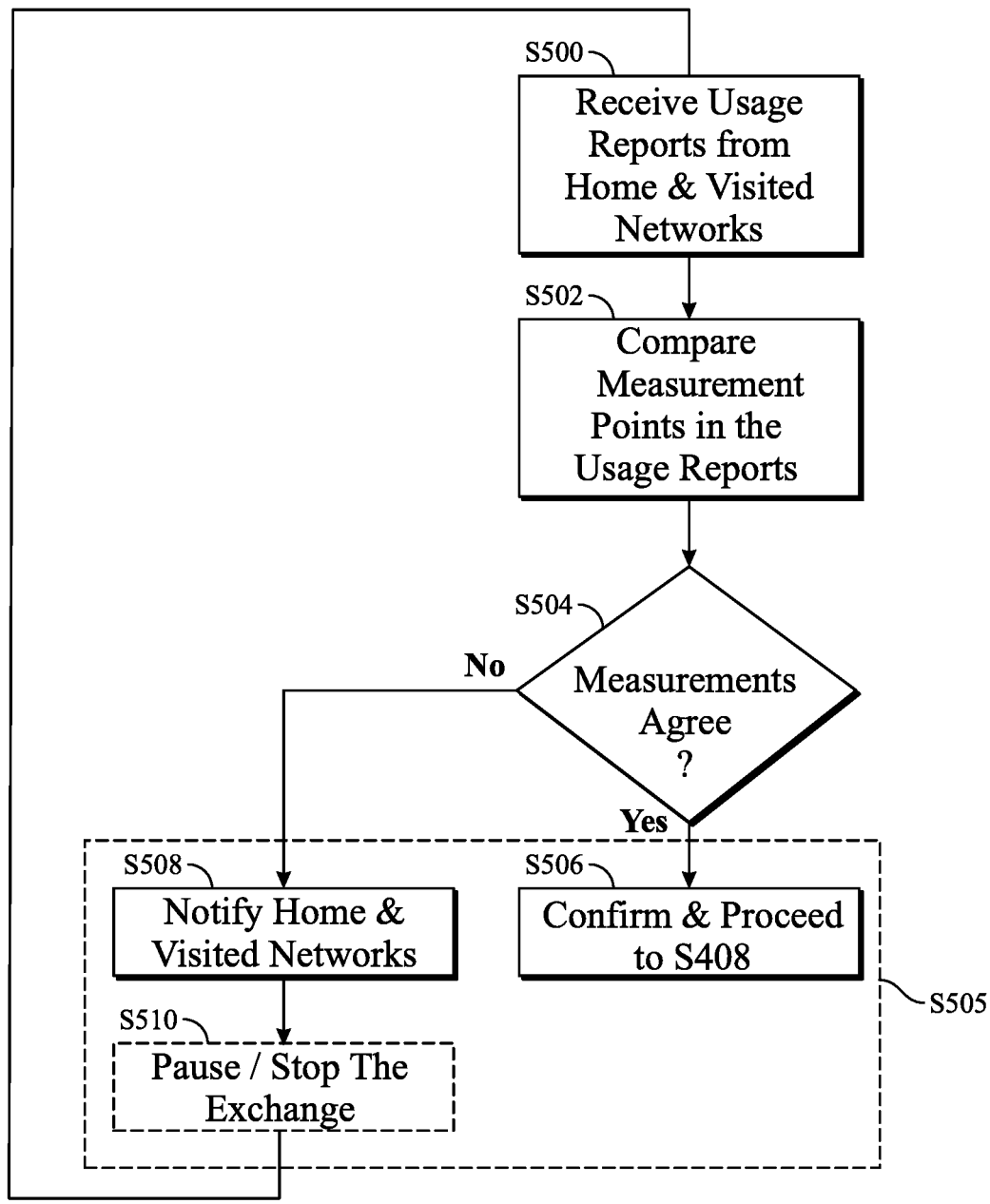
FIG. 5 is an example monitoring method.

FIG. 5 is an example monitoring method, which further describes the monitoring step S406 of FIG. 4. FIG. 5 will be described from perspective of any one of application nodes 250 of FIG. 2B. However, it will be understood that each application node 250 may have one or more processors having computer-readable instructions stored thereon, which when executed by one or more processors, allow application node 250 to perform steps of FIG. 5 as will be described below (by implementing various functional components described above with reference to FIG. 3A). Furthermore, FIG. 5 will be described with reference to FIGS. 1, 2A, 2B, 3A, 3B and 4. Within example structure of FIG. 2A, steps of FIG. 5 may be performed by each node 202 which may have one or more processors having computer-readable instructions stored thereon, which when executed by one or more processors, allow each node 202 to perform steps of FIG. 5 as will be described below. Furthermore, steps of FIG. 5 may be performed by proxy router 312 and/or 354 instead of or in concert with (in combination with) application node 250.

At S500, application node 250 may receive usage reports indicative of wireless services used by end users 358 while roaming on visited network 352. Each usage report may be independently generated by each of home network 350 and visited network 352 based on monitoring network activity of end users 358 using any known or to be developed method. A usage report may be a completed template with entries corresponding to various measurements of wireless services according to the exchange (e.g., an entry for number of minutes used, amount of data used, amount of streaming services used, Quality of Service (QoS) experienced by end users 358, data upload/down rates, etc.). Such template may be automatically created by application node 250 and be populated by components of each of home network 350 and visited network 352 responsible for monitoring and measuring wireless services of visited network 352 used by end users 358. Such template may be periodically populated/updated by each respective application node 250 and consequently be used to update the smart contract on the distributed ledger system for the exchange between home network 350 and visited network 352.

At S502, application node 250 may compare the received usage reports to determine if measurements of used services (e.g., minutes used, amount of data used, etc.) included in each usage report agree, where such agreement may include instances where the difference between them is within a margin of error, within an agreed upon tolerance, deviation, etc. At S502, application node 250 may compare any two corresponding measurement points included in the received usage reports (e.g., amount of data used as reported by home network 350 with an amount of data used as reported by visited network 350, etc.).

At S504, application node 250 determines if the comparison indicates that one or more measurements included in the usage report, agree. For example, a usage report generated by home network 350 may indicate that 10 end users 358 have used a total of 5 GB of data (wireless services) provided by visited network 352 since activation of the exchange with visited network 352. Similarly, a usage report generated by visited network 352 may indicate a total 5.2 GB of data by the 10 end users 358. Furthermore, the terms and conditions of the exchange may indicate that a difference of less than 10% between measurements is acceptable.

Accordingly, application node 250 determines that the data usage measurements included in the two usage reports received at S500 agree.

Thereafter, application node 250 may perform a reconciliation process of S505 that is comprised of S506 or S508/S510 depending on the outcome of the comparison at S504. The reconciliation process of S505 may also be referred to as a verification process.

At S506, such reconciliation process includes confirming the usage reports received from home network 350 and visited network 352 and hence the proper and agreed upon performance of the visited network 352, after which the process reverts back to S408 of FIG. 4.

However, if at S504, application node 250 determines that the comparison indicates that a least one of the measurements of wireless services included in the two usage reports do not agree or are different (e.g., do not match or are not within an agreed upon or determined margin of error), then the reconciliation process mentioned above includes the process at S508, at which application node 250 may notify home network 350 and visited network 352 of such discrepancy, in response to which home network and visited network 350 may take remedial actions to resolve such difference in the usage reports. Such notification may be in a form of an electronic communication to operators of home network 350 and visited network 352 such as an electronic mail, a telephonic alert, etc. Thereafter, the process reverts back to S500.

Optionally, after S508, the reconciliation process can also include S510, at which application node 250 may pause or stop the exchange until a troubleshooting of a root cause of the discrepancies in measurement(s) is/are identified and resolved. Such pausing or stopping of the exchange may be implemented as a default implementation rule by application node 250 or may be an agreed upon term of the exchange. In one example, the exchange may be paused or stopped until such time at which home network 350 and/or visited network 352 confirm that root cause(s) of the identified discrepanci(es) is/are identified and resolved, after which the exchange may be resumed.

In another example and in addition to pausing/stopping the exchange at S510, a machine learning algorithm may continuously be executed on each application node 250, which allows the nodes of such distributed ledger system to learn of causes and remedial actions over time for curing discrepancies in usage reports. Accordingly, in one example, such discrepancies may be resolved automatically by application node 250.

Figure 6A:
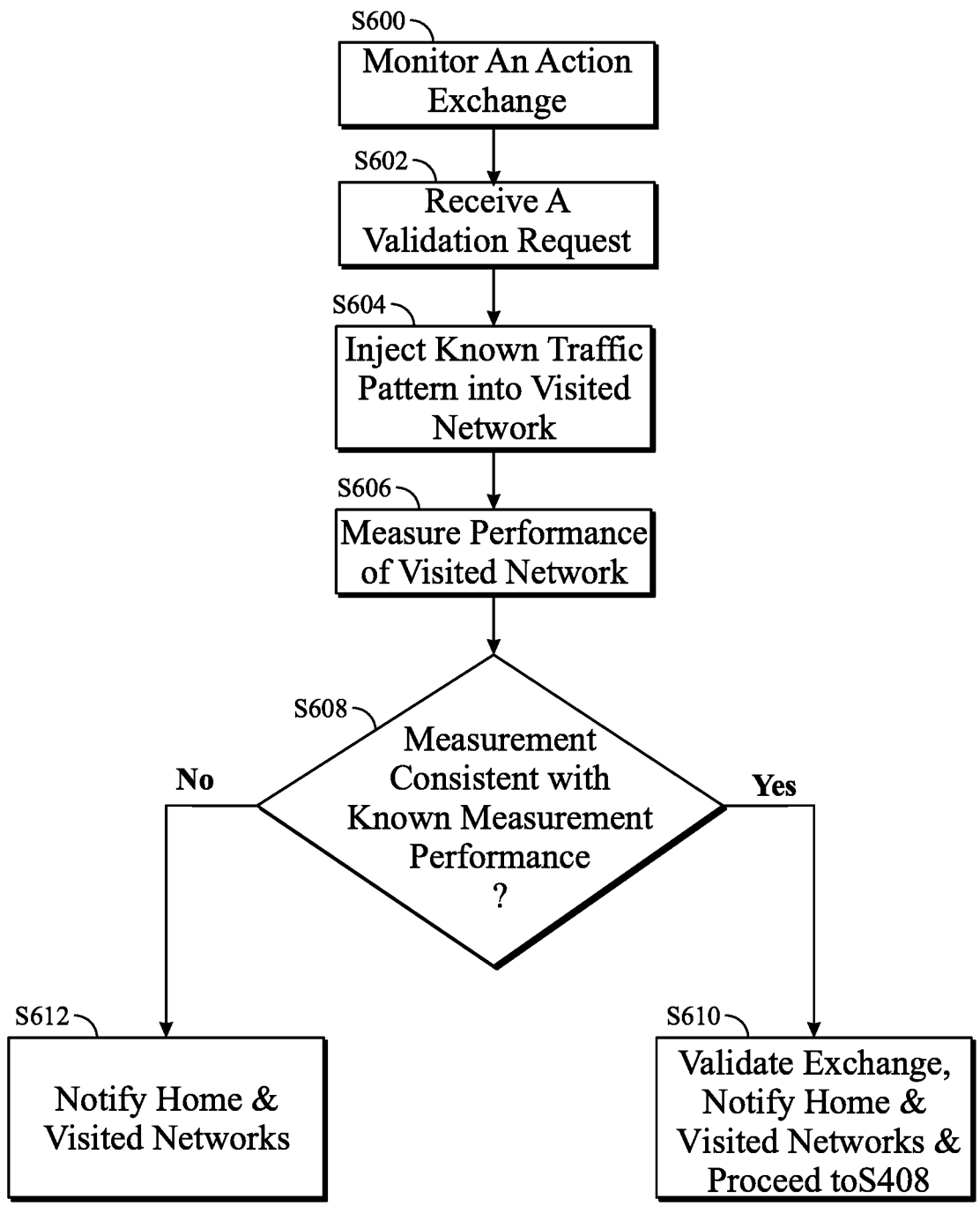
FIG. 6A is an example validation method during execution of an exchange.

Example embodiments described herein also provide an example advantage of allowing parties to an exchange to perform a validation process on wireless services provided by a visited network such as visited network 352 prior to finalizing and implementing an exchange (e.g., during negotiation of terms and conditions of an exchange) or during implementation of such exchange to ensure the wireless services are operating as they should. FIGS. 6A and B below describe examples of such validation process.

FIG. 6A is an example validation method during execution of an exchange. FIG. 6A will be described from perspective of any one of application nodes 250 of FIG. 2B. However, it will be understood that each application node 250 may have one or more processors having computer-readable instructions stored thereon, which when executed by one or more processors, allow application node 250 to perform steps of FIG. 6A as will be described below (by implementing various functional components described above with reference to FIG. 3A). Furthermore, FIG. 6A will be described with reference to FIGS. 1, 2A, 2B, 3A, 3B, 4 and 5. Within example structure of FIG. 2A, steps of FIG. 6A may be performed by each node 202 which may have one or more processors having computer-readable instructions stored thereon, which when executed by one or more processors, allow each node 202 to perform steps of FIG. 6A as will be described below. Furthermore, steps of FIG. 6A may be performed by proxy router 312 and/or 354 instead of or in concert with (in combination with) application node 250.

The process of FIG. 6A may be initiated at S600, where application node 250 monitors an active exchange between a home network such as home network 350 and a visited network such as visited network 352 for end users 358 of home network 350 to roam on and use wireless services of visited network 352. In one example, S600 may be triggered after S404 and/or S406 of FIG. 4 and may be implemented in conjunction with steps S406 and S408 of FIG. 4. The monitoring may include extracting terms and conditions from a corresponding smart contract and monitoring communications between components of visited network 352 and end users 358.

At S602, application node 250 may receive a validation request for validating wireless services of visited network 352. Such validation may be requested by home network 350, visited network 352. In one example, a validation may be requested in order to ensure that advertised wireless services are in fact being provided by visited network 352 and/or to ensure that benchmarks used to measure usage of wireless services are valid and accurate. This request may be received via user interface/dashboard 300 utilized by home network 350 and/or visited network 352.

In another example, at S602, instead of receiving a validation request, a recorded exchange (in the form of a smart contract stored on the distributed ledger system formed of nodes 202) may include triggering conditions for performing validation of wireless services offered by visited network 352. For example, one of the terms and conditions of the exchange may be that after a threshold amount of data is consumed by roaming end users 358 (e.g., 10 GB), a validation of wireless services of visited network 352 is to be performed to ensure service capabilities (e.g., to ensure certain QoS) and measurement means thereof are functioning properly. Accordingly, once 10 GB of data is consumed, application node 250 may trigger the validation process, as will be described below.

At S604, application node 250 may inject a known traffic pattern (which may also be referred to as a probe or test traffic) into visited network 352. A known traffic pattern may be on where amount of data used thereby is known, types of services and data used thereby are known, etc. A known traffic pattern can also be a previous traffic pattern used on visited network 352 as part of a previously implemented and settled exchange.

At S606, application node 250 may measure performance of visited network 352 in response to injection of the known traffic pattern into visited network 352.

At S608, application node 250 determines if the result of performance of visited network at S606 is consistent with a known network performance associated with the known traffic pattern.

If at S608, application node 250 determines that the result is consistent with the known network performance, at S610, application node 250 may validate the wireless services provided by visited network 352, notify home network 350 and visited network 352 of the validation (e.g., via an electronic or telephonic alert, via an electronic mail, etc.) and proceed to S408 of FIG. 4.

However, if at S608, application node 250 determines that the result is not consistent with the known network performance associated with the known traffic pattern, then at S612, application node 250 notifies the home network 350 and visited network 352 of the inconsistency, in response to which home network 350 and visited network 352 may take any number of actions including, but not limited to, not entering into an exchange, canceling/terminating the exchange, resolving network problems on visited network 352 that contribute to the inconsistent measurement, etc. In one example, the notification of S612 may automatically trigger cancellation or a pause in execution of the exchange by application node 250 and without explicit instructions from home network 350 or visited network 352 for canceling or pausing the exchange.

As noted above, the validation process, an example of which is described with reference to FIG. 6A, can also be part of negotiations leading to an exchange between a home network 350 and a visited network 352.

Figure 6B:
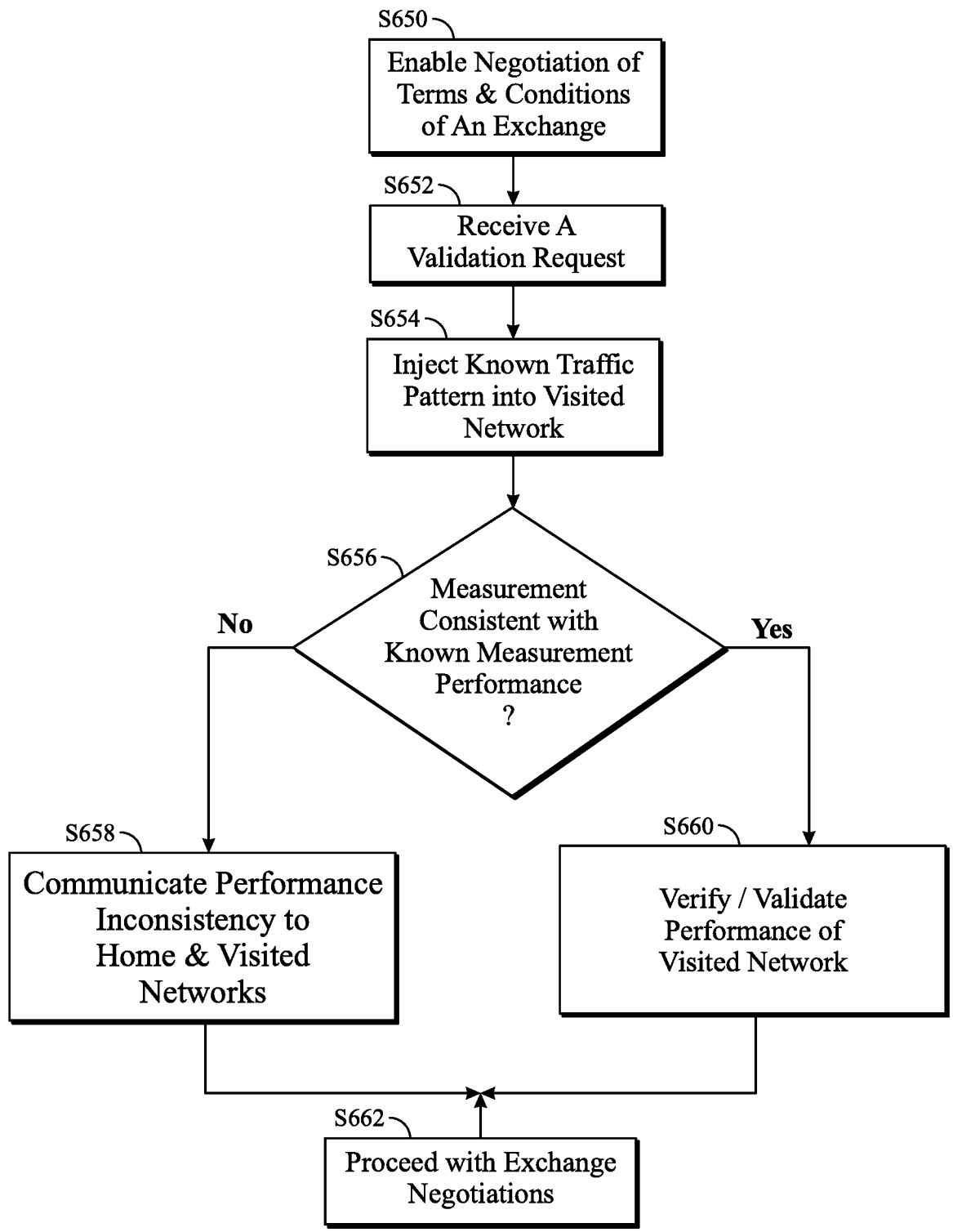
FIG. 6B is an example validation method prior to execution of an exchange.

FIG. 6B is an example validation method prior to execution of an exchange. FIG. 6A will be described from perspective of any one of application nodes 250 of FIG. 2B. However, it will be understood that each application node 250 may have one or more processors having computer-readable instructions stored thereon, which when executed by one or more processors, allow application node 250 to perform steps of FIG. 6B as will be described below (by implementing various functional components described above with reference to FIG. 3A). Furthermore, FIG. 6B will be described with reference to FIGS. 1, 2A, 2B, 3A, 3B and 4. Within example structure of FIG. 2A, steps of FIG. 6B may be performed by each node 202 which may have one or more processors having computer-readable instructions stored thereon, which when executed by one or more processors, allow each node 202 to perform steps of FIG. 6B as will be described below. Furthermore, steps of FIG. 6B may be performed by proxy router 312 and/or 354 instead of or in concert with (in combination with) application node 250.

At S650, application node 250 may enable negotiation of terms and conditions of an exchange between two wireless service providers such as home network 350 and visited network 352. The enabling of negotiation of terms and conditions may be according to various examples described in U.S. application Ser. No. 16/192,629 filed on Nov. 15, 2018 and U.S. application Ser. No. 16/197,900 filed on Nov. 21, 2018, the entire content of both of which are incorporated herein by reference in their entirety.

As part of negotiations of terms and conditions (which when finalized are stored as a smart contract on distributed ledger system formed of nodes 202, as described above with reference to FIGS. 2A and 2B), at S652, application node 250 may receive a validation request for validating wireless services provided/offered by visited network 352. This request may be received from home network 350 or visited network 352. This request may be received via user interface/dashboard 300 utilized by home network 350 and/or visited network 352.

Thereafter, at S654, application node 250 may perform an injection process, which is the same as that described with respect to S604 of FIG. 6A and therefore, will not be described further for sake of brevity.

At S656, application node 250 may compare measurements based on injected known traffic, with known measurement performances in the same way as described with respect to S606 of FIG. 6A and therefore, will not be described further for sake of brevity.

If at S565, application node 250 determines that the measurements do not correspond to known measurement performances, then at S658, application node 250 may communicate such performance inconsistencies to home network 350 and visited network 352 according to any known or to be developed method (e.g., via an electronic mail, a telephonic alert, etc.). However, if at S656, application node 250 determines that the measurements are consistent with known measurement performances (e.g., there is an exact match or there is inconsistencies that are within an identified (predetermined) margin of error or tolerance), then at S660, application node 250, may validate the wireless services of visited network 352 and communicate an indication of such validation to home network 350 and/or visited network 352 according to any known or to be developed method (e.g., via an electronic mail, a telephonic alert, etc.).

Thereafter, the process may proceed to S662, where application node 250 implements remaining steps for generating an exchange (generating terms and conditions of an exchange) between home network 350 and visited network 352, according to various examples described in U.S. application Ser. No. 16/192,629 filed on Nov. 15, 2018 and U.S. application Ser. No. 16/197,900 filed on Nov. 21, 2018, the entire content of both of which are incorporated herein by reference in their entirety.

In one example, when at S656, application node 250 determines that the measurements are not consistent with known measurement performances, at S662, application node 250 may terminate the negotiation or adjust prices and services offered.

Having described various examples of monitoring, management and validation of agreements for exchange of wireless communication services, various components of a node 202, an application node 250, proxy router 312 or 354, or controller 204 will be described with reference to FIG. 7.

Figure 7:
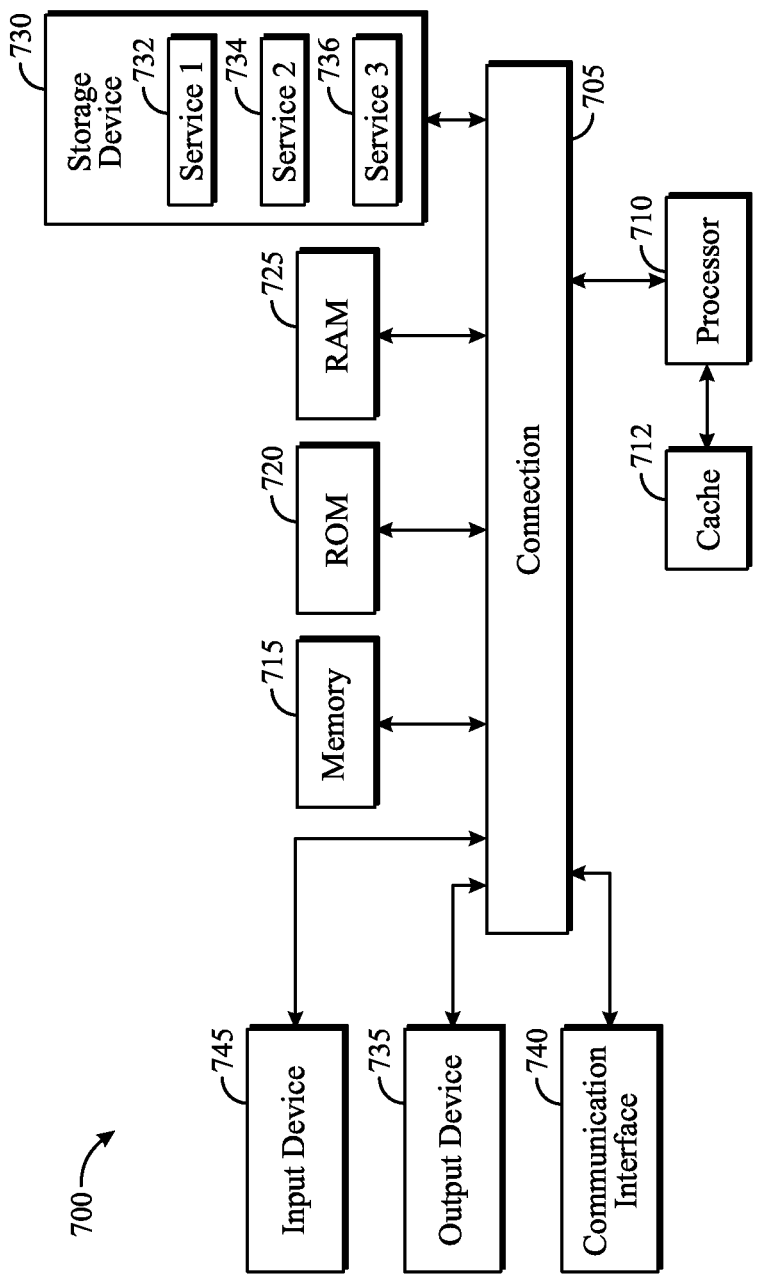
FIG. 7 illustrates example components of a node of FIGS. 2A-B.

Prior to describing FIG. 7, it should be noted that while two networks (e.g., home network 350 and visited network 352) are used to described example embodiments above, the present disclosure is not limited thereto. For example, an exchange need not be limited to only two parties but may be between multiple parties such as two or more home networks and single visited network or a single home network and two or more visited networks.

FIG. 7 illustrates example components of a node of FIGS. 2A-B.

In this example, FIG. 7 illustrates a computing system 700 including components in electrical communication with each other using a connection 705, such as a bus. System 700 includes a processing unit (CPU or processor) 710 and a system connection 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1

732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric. The storage device 730 can be local and directly attached to connection 705 or can be located far away and communicatively coupled to other components of system 700.

To enable user interaction with system 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with system 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

Example embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EE-PROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A distributed ledger system comprising:
a plurality of wireless service providers including at least a first wireless service provider and a second wireless service provider, wherein:
the first wireless service provider has a corresponding number of end users, and
the second wireless service provider is configured to provide roaming services to one or more of the end users of the first wireless service provider to roam on; and
a plurality of nodes, each of the plurality of nodes of the distributed ledger system being associated with one of the plurality of wireless service providers and configured to:
access a digital record of an exchange of wireless services between the first wireless service provider and the second wireless service provider on the distributed ledger system, the digital record including agreed upon terms and conditions of the exchange;
enable roaming of the one or more of the end users on the second wireless service provider upon detecting a first triggering condition;
inject a known traffic pattern into a network of the second wireless service provider;
independently monitor usage of the wireless services of the second wireless service provider by the one or more end users using the known traffic pattern;
independently verify the roaming based on the monitoring of the wireless services; and
terminate the roaming of the one or more of the end users upon detecting a second triggering condition.

2. The distributed ledger system of claim 1, wherein the digital record is a smart contract.

3. The distributed ledger system of claim 1, wherein the first triggering condition is defined by the terms and conditions for initiating the roaming of the one or more of the end users on the second wireless service provider.

4. The distributed ledger system of claim 1, wherein the first triggering condition is a defined time period for initiating the roaming of the one or more of the end users on the second wireless service provider.

5. The distributed ledger system of claim 1, wherein the first triggering condition is a detection of the one or more of the end users in coverage area of the second wireless service provider.

6. The distributed ledger system of claim 1, wherein the second triggering condition is an expiration of a time period over which the terms and conditions are valid.

7. The distributed ledger system of claim 1, wherein the second triggering condition is absence of any of the one or more of the end users in coverage area of the second wireless service provider for a period of time that exceeds a threshold.

8. The distributed ledger system of claim 1, wherein each of the plurality of nodes is configured to monitor the usage of the wireless services by receiving an independent usage report on state of the usage of the wireless services from each of the first wireless service provider and the second wireless service provider.

9. The distributed ledger system of claim 8, wherein each of the plurality of nodes is configured to verify the roaming by:
comparing the independent usage report received from each of the first wireless service provider and the second wireless service provider; and
determining that all corresponding wireless service measurements included in the independent usage report received from each of the first wireless service provider and the second wireless service provider match.

10. The distributed ledger system of claim 1, wherein each of the plurality of nodes includes an associated proxy router for accessing the digital record, enabling the roaming, validating the roaming and terminating the roaming.

11. A method comprising:
accessing, by each of a plurality of network nodes of a distributed ledger system, a digital record of an exchange of wireless services between a first wireless service provider and a second wireless service provider that provides roaming services for one or more end users of the first wireless service provider, the digital record including agreed upon terms and conditions of the exchange, each of the plurality of network nodes being associated with a different one of the first wireless service provider and the second wireless service provider;
enabling, by each of a plurality of network nodes, roaming of the one or more of the end users on the second wireless service provider upon detecting a first triggering condition;
injecting a known traffic pattern into a network of the second wireless service provider;
independently monitoring, by each of a plurality of network nodes, usage of wireless services of the second wireless service provider by the one or more end users using the known traffic pattern;
independently verifying, by each of a plurality of network nodes, the roaming based on the monitoring of the wireless services; and
terminating, by each of a plurality of network nodes, the roaming of the one or more of the end users upon detecting a second triggering condition.

12. The method of claim 11, wherein the first triggering condition is: defined by the terms and conditions for initiating the roaming of the one or more of the end users on the second wireless service provider; and
one of a defined time period for initiating the roaming of the one or more of the end users on the second wireless service provider or a detection of the one or more of the end users in coverage area of the second wireless service provider.

13. The method of claim 11, wherein the second triggering condition is one of an expiration of a time period over which the terms and conditions are valid or absence of any of the one or more of the end users in coverage area of the second wireless service provider for a period of time that exceeds a threshold.

14. The method of claim 11, wherein the monitoring comprises receiving an independent usage report on state of the usage of the wireless services from each of the first wireless service provider and the second wireless service provider.

15. The method of claim 14 wherein the verifying comprises: comparing the independent usage report received from each of the first wireless service provider and the second wireless service provider; and determining that all corresponding wireless service measurements included in the independent usage report received from each of the first wireless service provider and the second wireless service provider match.

16. A distributed ledger system comprising:

a plurality of wireless service providers including at least a first wireless service provider and a second wireless service provider, wherein:

the first wireless service provider has a corresponding number of end users, and the second wireless service provider is configured to provide roaming services to one or more of the end users of the first wireless service provider to roam on; and a plurality of nodes, each of the plurality of nodes of the distributed ledger system being associated with one or more of the plurality of wireless service providers and configured to:

facilitate an exchange of wireless services between the first wireless service provider and the second wireless service provider;

inject a known traffic pattern into a network of the second wireless service provider;

independently validate the wireless services of the second wireless service provider using the known traffic pattern; and manage the exchange based on results of validating the wireless services.

17. The distributed ledger system of claim 16, further comprising:

receiving a request for validating the wireless services from the first wireless service provider prior to finalizing terms and conditions of the exchange or after execution of the terms and conditions of the exchange.

18. The distributed ledger system of claim 16, wherein the validating is triggered based on terms and conditions of the exchange.

19. The distributed ledger system of claim 16, wherein each of the plurality of nodes is configured to independently validate the wireless services of the second wireless service provider by determining whether a performance of the network matches a known outcome associated with the known network traffic pattern.

20. The distributed ledger system of claim 16, wherein managing the exchange includes:

finalizing the exchange if the wireless services are validated; or terminating the exchange after execution of terms and conditions of the exchange, if the wireless services cannot be validated.

\* \* \* \* \*